March 14, 1944. M. KASSER 2,344,151
METHOD AND APPARATUS FOR TREATING PERISHABLE ARTICLES
Filed Sept. 9, 1940 3 Sheets-Sheet 1

INVENTOR.
MORRIS KASSER
BY George B. White
ATTORNEY.

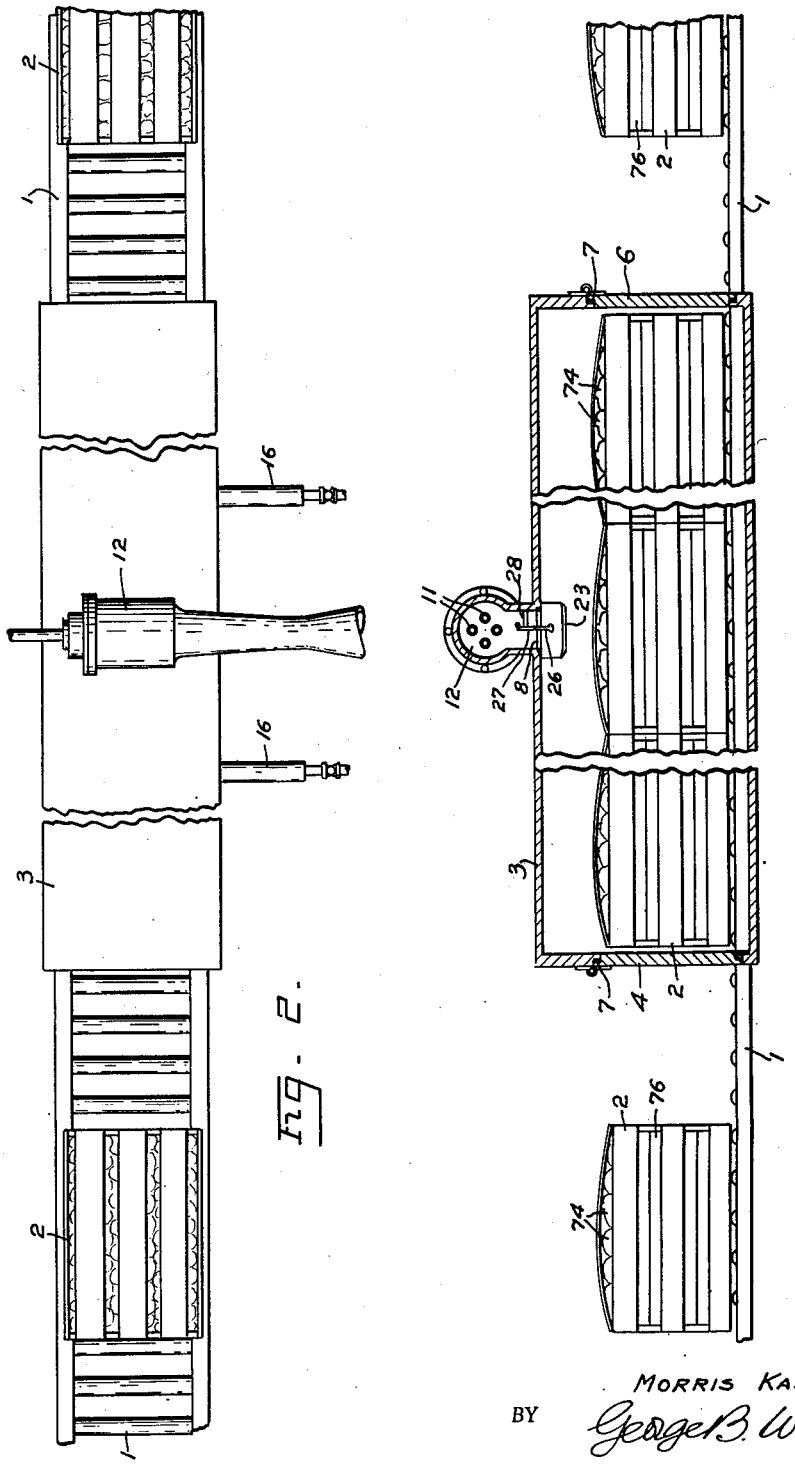

March 14, 1944. M. KASSER 2,344,151
METHOD AND APPARATUS FOR TREATING PERISHABLE ARTICLES
Filed Sept. 9, 1940 3 Sheets-Sheet 3

INVENTOR.
MORRIS KASSER
BY George B. White
ATTORNEY.

Patented Mar. 14, 1944

2,344,151

UNITED STATES PATENT OFFICE 2,344,151

METHOD AND APPARATUS FOR TREATING PERISHABLE ARTICLES

Morris Kasser, San Francisco, Calif.

Application September 9, 1940, Serial No. 355,971

16 Claims. (Cl. 99—193)

This invention relates to a method and apparatus for treating vegetables, fruits, perishable articles, and the like.

An object of this invention is to provide a method and apparatus whereby perishable articles, such as vegetables and fruit are efficiently and speedily precooled prior to shipping or storage so as to be subjected and held under a desired temperature immediately after harvesting.

Another object of this invention is to provide a method and apparatus for precooling vegetables and fruit speedily and in large quantities substantially under vacuum, during the movement of the fruit from packing to storage or shipping, and without material interruption of the movement of said vegetables and fruit.

Another object of this invention is to provide a method and apparatus for withdrawing the air or foreign substances from vegetables or fruit and the like, and replacing the withdrawn air with a substance which retards the ripening of the fruit or breaking down of the tissues of the vegetable or fruit, in other words, the replacing of the air in the packages of vegetable or fruit with a substance which enhances the keeping qualities of the vegetables or fruit in storage or shipping.

Another object of this invention is to provide a method and apparatus for precooling vegetables, fruit or the like under vacuum and replacing the air withdrawn from said vegetables and fruit with a substance which will better the keeping qualities of the vegetables and fruit.

Another object of this invention is to provide a method and apparatus whereby perishable articles are carried in packages during their movement toward storage or shipping, or the like, so as to be subjected to vacuum for removing foreign substances and air from said articles and then to be subjected to a treatment for retarding the deterioration of said perishable articles in storage or shipping.

Another object of this invention is to provide a method and apparatus whereby ice is produced in the packages of the perishable products at a point of their passage toward shipping or storing, and without material interruption of their passage.

Another object of this invention is to provide a method wherein perishable products are packed in separated layers, and ice or other substance is formed between said layers speedily and so as to keep the product fresh during shipping, storage or the like.

Another object of this invention is to provide a product which includes a package of perishable articles arranged in separated layers with a layer of substance between the layers of said articles to keep said articles fresh for a comparatively long period.

Other objects of the invention together with the foregoing will be set forth in the following description of the preferred method, and the preferred embodiment of means for practicing the same, which is illustrated in the drawings accompanying and forming part of the specification. It is to be understood that I do not limit myself to the embodiment disclosed in said description and the drawings as I may adopt variations of my preferred forms within the scope of the invention.

The invention is clearly illustrated in the accompanying drawings, wherein:

Fig. 2 is a fragmental, somewhat diagrammatic plan view of my apparatus.

Fig. 3 is a somewhat diagrammatic, sectional side view of my apparatus.

Figure 1:
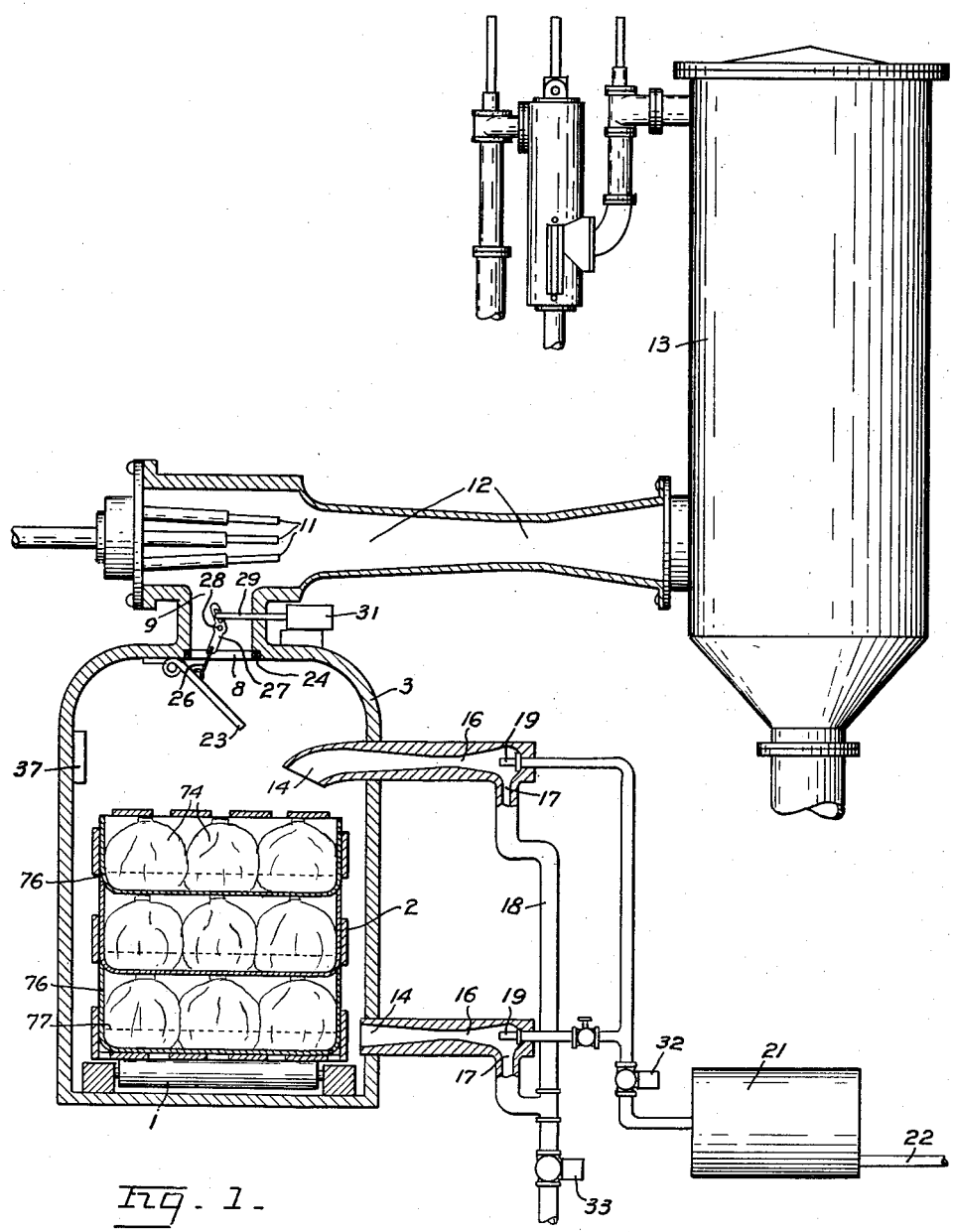
Fig. 1 is a somewhat diagrammatic view, partly in section, of an embodiment of my apparatus for treating perishable articles in accordance with my invention.

In connection with perishable articles or products, such as vegetables, fruits, food products, and the like, it is necessary to so package and treat them as to permit the shipping or storing of the same for a period longer than the natural period of freshness of said article. Such articles are subject to certain physical and chemical changes which are destructive in nature and which, if not retarded, cause deterioration and spoiling of the articles. Generally the freshness of perishable articles is preserved to a period, varying according to the nature of the article, by low temperatures and sometimes by chemical compounds. Heretofore any cooling for shipment or storing involved cumbersome equipment, slow operation, and limitations as to speed and quantity handled. It is essential that perishable products be treated promptly and speedily immediately after harvesting them so as to preserve all of their freshness. Some of the present methods of cooling involves many hours, sometimes even days to cool the articles to a desired low temperature, before they can be stored or shipped.

In my method perishable articles are precooled to a desired temperature very quickly. Then the articles are subjected to a substance to protect them in their cooled condition. All the steps of this method are performed speedily and without material interruption of the passage of the articles toward storage or shipping, or the like.

In the herein illustrative embodiments of my invention, the invention is shown as applied particularly to the handling and treating of lettuce, but it is to be understood that this method is applicable to many other kinds of vegetables and fruits and perishable articles which require similar treatment, although the temperatures and chemical substances used may be varied to suit the respective products. For instance, asparagus, corn (green), endive, peas (green) and spinach respond to about the same temperatures for effective precooling, among the fruits, apples and pears, are particularly adapted for treatment by this method.

The vegetables or fruits after harvesting, are placed usually in open packages. Lettuce is suitably crated. The crates of lettuce are then usually moved along a roller conveyor table to the storage compartment or for shipping. During the passage of the crates of lettuce, and with only a momentary interruption of their passage, the crates of lettuce are subjected to refrigeration under vacuum so as to precool the lettuce to the desired temperature. The air and loose moisture drawn by the vacuum out of the lettuce is then replaced by a substance drawn into the interstices of the lettuce by said vacuum so as to form a protective coating on the lettuce leaves. The lettuce crates are then carried on a continuous path out of the vacuum chamber and to their destination.

In detail, in this method of treating lettuce, the lettuce is placed in crates immediately after harvesting. For this purpose the usual crates may be used. In the crates the lettuce is packed in layers. Each layer of lettuce is separated from the others by a layer of separating substance. For instance, each layer of lettuce is placed on trays of waterproof material adapted to contain fluid. The trays are so formed as to extend above the level of the layer of lettuce and overlap the outer sides of the next tray thereabove. Each of these trays contains a substance capable of freezing, in this instance water. The level of water in the trays is such as to afford complete freezing during the precooling operation. The heads of lettuce are set in said layer of water. In connection with articles which would be injured by direct contact with water, double trays may be provided for each layer containing the water between the bottoms of the double trays.

The crated lettuce is then subjected to refrigeration preferably by the so-called water vapor refrigeration method, for rapid pre-cooling. This is accomplished during the normal passage of the lettuce crates toward storage or shipping, or the like. The crates of lettuce are moved intermittently on suitable conveyors or conveyor tables and the refrigerating vacuum is drawn at a point along this path of conveyance so as to surround the conveyors and a number of crates thereon. The crates of lettuce are treated without removal from the conveyor system, without deviation from their normal path and during a brief intermission in their movement. At this point a chamber is inclosed temporarily around the conveyor path and around a number of crates of lettuce thereon, and a vacuum is drawn rapidly in said chamber. This vacuum draws the air and impurities from the lettuce and it also rapidly evaporates certain of the water or moisture. The lettuce is cooled thus to about the freezing point. Simultaneously the water layer in the trays is frozen to ice, and part of said evaporating water, during the vacuum refrigeration, freezes around and upon the lettuce so as to form ice around the lettuce in each layer in the crates. When a predetermined temperature is reached in said vacuum chamber, or after a predetermined period of treatment, the drawing action of said vacuum is automatically discontinued.

About simultaneously with the completion of the freezing operation and before the vacuum is broken in said chamber, a protective substance is injected into said chamber. This substance is wholly or partly drawn in by the vacuum in the chamber, so as to replace the air drawn from the layers of lettuce. This protective substance is rapidly drawn into the interstices of the lettuce leaves and forms a protecting coating. This substance may be an edible mineral oil, or a suitable hygroscopic substance, such as lithium chloride, calcium chloride, or calcium sulphite, or such hygroscopic material mixed with an oil suitable to form a protective coating film which can draw moisture from the air to keep the lettuce fresh.

For the purpose of atomizing this protective substance into the crates, any suitable gaseous substances may be used. For instance, air, ozone, oxygen, hydrogen or mixtures thereof can be used to spray or draw the liquid coating material in finely divided condition, into the vacuum of the chamber. In some instances when coating is undesirable, only gaseous substances are introduced to replace the air drawn from the package or crate of perishable articles. In connection with fruits, such as apples, pears, plums, cherries, peaches, or berries, the use of carbon dioxide was found to be advantageous. In such instances the vacuum created in the cooling chamber and in the layers of fruit is refilled by a desired concentration of carbon dioxide drawn in by the vacuum remaining immediately subsequent to the cooling operation. The separating layers or trays then collect and retain at the bottom of each layer a certain amount of carbon dioxide, for some time. By suitably covering the packages shortly after pre-cooling, a desirable carbon dioxide concentration may be retained around the fruit for a comparatively long period. In connection with lettuce ozone in suitable mixture is desirable, because ozone is an effective sterilizer and its action can be controlled even to the degree of bleaching action, if necessary. Due to the difference in density when ozone or other gaseous mixture is used with a liquid spray, the gaseous substance reaches the lettuce before the liquid vapor settles on the lettuce. The result is a protective layer or coating around the lettuce, formed of a protective substance, made of suitable atomized liquid or mixture with a sterilizer substance.

The crates of lettuce so treated are moved along their continuous path out of said vacuum chamber so as to give place to the next group of crates of lettuce. The treated lettuce in said crates is then suitably covered. If necessary an ice pack may be provided on the top of the crate also, before the crates of lettuce are placed in storage or in the refrigerating cars for shipment.

It is to be noted that the operation may be temperature or time controlled so as to discontinue the refrigeration before any injury can be caused to the perishable articles treated, and also to control the amount of protective film or coating applied to said articles.

In carrying out my invention I make use of an apparatus which includes a suitable conveyor table 1 on which the crates of lettuce 2 are moved on a substantially continuous path. A vacuum tank 3 surrounds a portion of the conveyor table 1 for a sufficient distance to accommodate a number of crates therein at the same time. The vacuum tank 3 has a swingable inlet gate 4 at one end thereof and a swingable outlet gate 6 at the other end thereof which gates are suitably packed, for instance by seating the gates on padded edges 7 of the respective openings of the tank 3. The conveyor table 1 extends through said tank 3 so that the crates thereon are advanced through the open inlet when the inlet gate 4 is open and out through the open outlet gate 6.

The chamber in the tank 3 forms a chamber in which the vacuum is to be created. At the top of the tank 3 is a port 8 to which is connected the suction inlet 9 of a vacuum creating mechanism. In the herein illustration the so-called water vapor refrigeration is used. The intake 9 leads into the suction passage around a plurality of nozzles 11 of an ejector mechanism which propels air and causes evaporation at a high velocity. It is to be noted that the nozzles 11 preferably issue jets of steam through a Venturi passage 12 and discharge to a suitable condenser mechanism 13. The condensation of the steam jets creates the desired high velocity flow which sucks the air through the suction inlet 9 out of the chamber of the tank 3. The capacity of this suction mechanism is such that it draws the air from the tank 3 very rapidly. The moisture present in the lettuce packages is partly evaporated and the rapid creation of vacuum and evaporation quickly refrigerates the crates of lettuce in said tank 3 and freezes the water therein into an ice pack. This effectively precools the crates of lettuce for storage or shipment under refrigeration. The speed of operation permits the handling of large quantities in comparatively short time, so that the crates of lettuce can be precooled about as fast as they are crated immediately after harvest and while still fresh. This precooling is accomplished practically at the usual rate of movement of the crates during packing.

The further treatment of the lettuce by applying a protective coating is performed through spray nozzles 14 extended into the tank 3. Each nozzle has a Venturi tube 16 into which discharges an orifice 17. The orifice 17 is connected by a conduit 18 to a source of supply of the protective substance to be used, such as a supply of suitable mineral oil, or liquid mixture. Into the Venturi tubes 16 discharge jets 19 which are connected to a supply of gaseous substance to be injected into the lettuce, for instance, ozone. This gaseous substance is contained in a container 21 which latter is connected in turn by a line 22 to a suitable supply such as an ozone generator or the like, not shown. The vacuum in the tank 3 draws the ozone through said nozzles 14, and the ozone sucks a spray of the protective substance from the orifices 17. The mixture thus injected into the crates of lettuce occupies the place of the air or other substances previously drawn out of the crates and out of the lettuce by said ejector mechanism. This new protective mixture fills the interstices of the precooled lettuce almost instantaneously.

The control of the device is automatically accomplished in this illustration by suitable magnetic and electric controls. A suitable valve is provided for closing the port 8 at will, and suitable supply valves are provided for controlling the supply of the gaseous and liquid substances to the nozzles 16. The operation of these valves is co-ordinated so as to control the steps of refrigeration and injection in proper sequence and for proper periods or to a suitable degree. In this illustration, the valve at the suction port 8 is shown as a hinged gate valve 23 which swings over a valve seat 24 in the port 8. The gate valve 23 is connected by a link 26 to an arm of a bell-crank lever 27 which latter is fulcrumed at 28 in the suction intake 9 above the gate valve 23, so that when the bell-crank lever 27 is turned in opposite directions it respectively closes or opens the gate valve 23. The other arm of the bell-crank 27 is connected by a rod 29 to a usual and suitable magnetic valve actuating mechanism 31. The mechanism is the usual spring controlled type and the connection is such that the gate valve 23 is open when the magnet or solenoid of the valve actuating mechanism 31 is demagnetized and the gate valve 23 is closed by the magnetization of the valve actuator mechanism 31. Suitable magnetic valves 32 and 33 respectively control the passage through the liquid conduit 18 and the flow of the gaseous supply from the container 21. These magnetic valves 32 and 33 are normally closed and are opened when the solenoids thereof are energized. After the precooling reaches a desired degree, the gate valve 23 is closed to prevent further refrigeration, and the magnetic valves 32 and 33 are opened to allow the injection of the protective substances into the vacuum chamber of the tank 3 and into the crates of lettuce 2 in said vacuum chamber.

Figure 4:
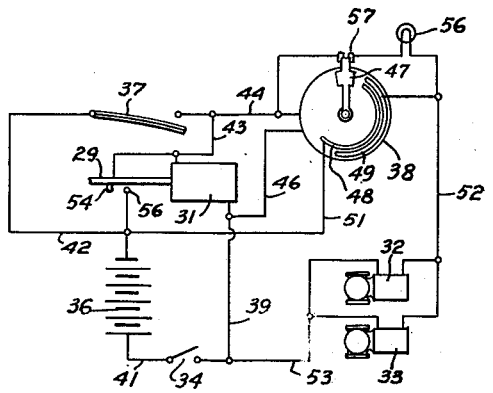
Fig. 4 is a wiring diagram of the automatic control of the apparatus by temperature and time control.

In Fig. 4 is illustrated a control circuit wherein the refrigeration is controlled by the temperature in the tank 3. This electric circuit includes a suitable switch 34, a source of electricity 36, a thermosatic circuit breaker 37 and a time control circuit breaker 38. These elements of the circuit are interconnected with the normally open magnetic gate valve actuator 31 and the normally closed magnetic valves 32 and 33. The ejector mechanism may be also connected to the switch 34 or operated by a separate switch not shown. When the switch 34 is closed the circuit is partly closed between a line 39, leading from a terminal of the magnetic valve actuator 31 to said switch 34, and a line 41 leading to a terminal of the source of electricity 36. A line 42 connects the other terminal of the source of electricity 36 to the thermostatic circuit breaker 37. The other terminal of the thermostatic circuit breaker 37 is connected by a line 43 to the other terminal of the magnetic gate valve actuator 31. The thermostatic circuit breaker 37 is located in the tank 3 in a convenient position to react to critical temperatures. When the temperature in the tank 3 reaches a degree to which the thermostatic circuit breaker 37 is adjusted then the temperature moves the thermostatic circuit breaker 37 to a circuit closing position so that it completes the circuit for the energization of the magnetic valve actuator 31 which latter in turn closes the gate valve 23 so as to stop further suction from the tank 3. The timing mechanism 38 is suitably connected by a line 44 to the normally open end of the thermostatic circuit breaker 37 and by a line 46 to the circuit of the switch 31 so that when the thermostatic circuit breaker 37 is closed it also closes the circuit of the usual timing mechanism of the timing circuit breaker 38 so as to rotate a suitable bridge arm 47. This bridge arm 47 rotates in clockwise direction viewing Fig. 4 so that after a short movement it closes the circuit between a pair of arcuate contacts 48 and 49. The arcuate contact 48 is connected by a line 51 to the source of electricity 36. The other arcuate contact 49 is connected by a line 52 to one of the terminals of each supply valve 32 and 33. The other terminals of the magnetic supply valves 32 and 33 are connected by lines 53 to the switch 34 and through the switch 34 to the source of electricty 36. During the movement of the bridge arm 47 over the arcuate contacts 48 and 49 the circuits of the magnetic valves 32 and 33 are closed and said valves 32 and 33 are opened to admit the protective substance to the nozzles 14. After the bridge arm 47 has passed the arcuate contacts 48 and 49 the circuits are broken and the valves 32 and 33 are demagnetized and returned to their initial closed positions. Thus the introduction of the protective material into the tank 3 is controlled by the timing circuit breaker 38 which may be adjustable in the usual manner. It is to be noted that the gate valve 23 is kept closed after the stopping of the refrigeration action and until the completion of the treatment of the lettuce. This overlapping period of gate valve closing is accomplished by a circuit breaker contact 54 moved by the valve rod so as to be normally in circuit breaking position and to close the circuit through the other circuit breaker contact 56 when the gate valve 23 is closed. Thus the circuit is shunted across between the line 43 and the source of electricity 36 and keeps the gate valve actuator 31 energized even if the thermostatic valve 37 is opened by slightly rising temperature after the refrigerating operation. The gate valve 23 can be then opened by opening the switch 34 so as to deenergize the magnetic valve actuator 31.

In order to prevent the opening of the magnetic supply valves 32 and 33 for a second time during the same operation, a warning signal, such as a light 56, is connected into the electric circuit and is controlled by spaced circuit breaker contacts 57 which are bridged by an extension of the bridge arm 47 when the bridge arm is in its starting position. After each complete operation the bridge arm closes the circuit through the contacts 57 and operates the signal 56 so that the operator may open the switch 34 and break the main opening circuit. It is to be understood that any other type of signal may be used in place of the light 56 herein shown. If so desired, in place of the light 56 a suitable electric relay may be provided for automatically breaking the main circuit at the switch 34 after each operation.

Figure 5:
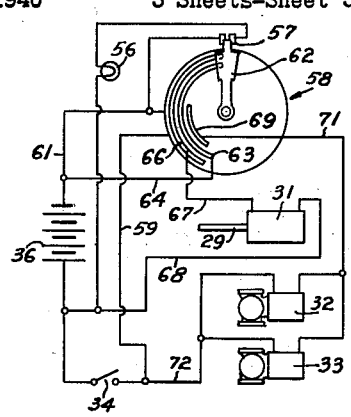
Fig. 5 is a wiring diagram of the automatic control of the apparatus by time control.

The electric circuit shown in Fig. 5 illustrates a fully time controlled arrangement for the gate valve actuator 31 and for the supply valves 32 and 33. In this circuit the main switch 34 is connected to the source of electricity 36. The timing mechanism of the timing circuit breaker 58 is connected by a line 59 to the switch 34 and by a line 61 to the other terminal of the source of electricity 36 so that when the switch 34 is closed the timing mechanism is operated and the bridge arm 62 of the timing circuit breaker 58 is rotated in a clockwise direction viewing Fig. 5. In this illustrative embodiment the timing circuit breaker 58 is provided with three contact rails to be bridged by the bridge arm 62. The central arcuate rail is a live rail 63 connected by the line 64 to a terminal of the source of electricity 36. The outer parallel rail 66 is connected by the line 67 to a terminal of the gate valve actuator 31. The other terminal of the gate valve actuator 31 is connected by a line 68 to the source of electricity 36. The inner short rail 69 is connected by the line 71 to one terminal of each of the supply valves 32 and 33, the other terminals of which latter are connected by lines 72 to the main switch 34. It is to be noted that in this embodiment the bridge arm 62 in its neutral or initial position overlies the upper ends of the live rail 63 and of the outer rail 66 so as to keep the circuit closed through the gate valve actuator 31 and thereby keep the gate valve 23 closed when refrigeration is not required. When the switch 34 is closed the bridge arm 62 is rotated in a clockwise direction, viewing Fig. 5, and leaves the rails so as to break the operating circuit of the gate valve actuator 31 and cause the opening of the gate valve 23. The refrigeration is thus continued while the bridge arm 62 rotates around to the other ends of the rails 63 and 66 at which point the circuit therethrough is closed, again causing the closing of the gate valve 23. The lower end of the short rail 69 is spaced from the end of the live rail 63 so that it is bridged shortly after the closing of the gate valve actuator circuit. While the bridge arm 62 travels over the short rail 69 the supply valves 32 and 33 are energized and opened. In view of the shortness of the short rail 69, the supply valves 32 and 33 are closed first and the gate valve 23 is kept closed for a period thereafter. The signal light 56 heretofore described, is connected into the circuit and its circuit breaker contacts 57 are bridged by a portion of the bridge arm 62 so as to signal the completion of the operation and the time for opening the main switch 34. The gate valve 23 is kept closed until the beginning of the next refrigeration operation.

Figure 6:
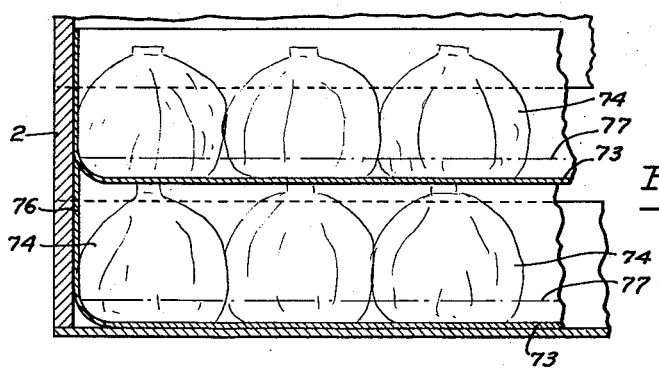
Fig. 6 is a fragmental sectional view showing the packing of the layers, of lettuce in the crates.

In Fig. 6 is shown in detail an arrangement of packing the layers of perishable articles, in this illustration lettuce. A tray 73 is laid on the bottom of the crate and the rows of lettuce 74 are placed in said tray 73. This tray has sides 76 extended above the usual height of the lettuce 74. Then a second tray 73 is placed over the lettuce packed in the first tray 73 and another layer of lettuce 74 is packed in it. The bottom of the second tray 73 extends into the first tray 73 so that the sides 76 of the first tray overlap the lower portions of the sides of the upper second tray 73. Similar layers are thus stacked in each crate with the respective sides of superposed trays overlapping so as to form a substantially continuous side lining for the crate. Each tray 73 has in its bottom a layer of liquid, in this instance water, to a suitable level indicated by the broken lines 77. The trays are made of comparatively thin, flexible material, such as waterproof sheets of paper or fibrous material. The adjacent sides of the superposed trays have a tendency to adhere to each other so as to allow suction action outwardly but retard entry into the trays and partially seal against impurities. The ice is kept at each layer of lettuce separately and without working its way down through the crate. Furthermore, the water to be frozen is divided in sufficiently thin layers in the different layers as to allow thorough freezing in a comparatively brief period of time. In case carbon dioxide is used in connection with such trays a concentration is kept for a time at the bottoms of said trays 73 even after exposure of the crates 2, to the atmosphere.

Figure 7:
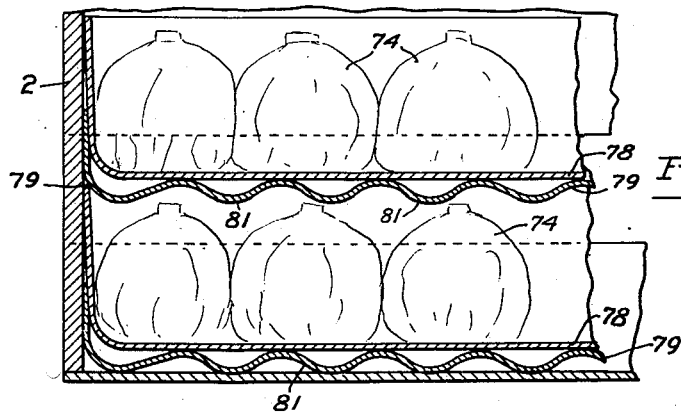
Fig. 7 is a fragmental sectional view of a modified form of packing of the layers of lettuce in the crates.

In the form shown in Fig. 7 each tray 78 is provided with a jacket 79 fitting over its bottom portion. This bottom jacket 79 has a plurality of corrugations 81 or alternate dents and protuberances so as to settle over the irregular supporting surfaces provided by the lower layers of lettuce 74. The space between the bottom jacket 79 and the bottom of the tray 78 is filled with the required liquid, such as water for freezing. This bottom jacket space also provides a compartment for suitable gaseous substances when such are used in connection with certain perishable articles. In other respects the lettuce is stacked in rows in the trays in the manner heretofore described.

I claim:

1. A method of treating vegetable produce which consists of drawing a vacuum in the presence of moisture on said vegetable produce, then permitting said vacuum to draw onto said vegetable produce an atomized mixture adapted to inhibit the deterioration of said vegetable produce.

2. A method of treating vegetable produce which consists of packing the vegetable produce in partially open superimposed layers, subjecting the packed vegetable produce to vacuum in the presence of sufficient moisture to cause at least partial refrigeration, and drawing into said layers by said vacuum an atomized mixture of gaseous and liquid substances adapted to form a protective coating for retarding deterioration of said vegetable produce.

3. In a method of preparing vegetable produce for the market, the steps of packing the vegetable produce in crates in superimposed layers and over separate layers of water, subjecting the crated vegetable produce to vacuum so as to evaporate and freeze said water and create a vacuum in and between said vegetable produce in the crates, and introducing an atomized protective medium into said vacuum so as to fill the spaces in and between said vegetable produce.

4. In a method of preparing vegetable produce for shipping and storing, the steps of rendering airtight a portion of the path through which the packaged produce travels toward storing and shipping, and cooling the packaged produce on said portion of its path by subjecting the produce to rapidly drawn vacuum in the presence of moisture.

5. In a method of preparing vegetable produce for the market, the steps of packaging said vegetable produce, conveying said packaged vegetable produce toward storage or shipping, momentarily stopping said vegetable produce on the path of said conveyance, subjecting the stopped vegetable produce to rapid vacuum in the presence of moisture whereby said vegetable produce is refrigerated in said package, discontinuing said refrigeration at a predetermined low temperature, and continuing the advance of said cooled articles toward storing or shipping.

6. In an apparatus for treating vegetable produce, the combination with a conveyor for conveying said produce from the place of packaging to the place of storing and shipping; of a water vapor vacuum refrigerator, the vacuum chamber of said refrigerator surrounding a portion of said conveyor, and means to render said vacuum chamber substantially airtight around said portion of the conveyor and around the packaged produce thereon at will so as to allow the rapid drawing of a vacuum in said chamber.

7. An apparatus for treating vegetable produce, comprising a conveyor system, a vacuum tank interposed into said system so that packaged vegetable produce on said system pass through said vacuum tank, means to close said tank at will so as to temporarily isolate the interior of the tank from the atmosphere, means to rapidly draw a vacuum in said tank to partially evaporate the free moisture from said vegetable produce in the packages in the tank so as to cool said produce.

8. An apparatus for treating vegetable products, comprising a vacuum chamber, means to produce vacuum in said chamber so as to evaporate the portion of the free moisture from said vegetable produce, means to introduce an atomized protective medium to said vegetable produce in said vacuum, means to automatically regulate the action of said vacuum and refrigeration on said vegetable produce, and means to operate said introducing means in predetermined relation to the action of said vacuum and refrigeration.

9. An apparatus for treating lettuce comprising, conveyor means on which crates of lettuce are conveyed, a vacuum tank surrounding a portion of said conveyor means so as to inclose crates of lettuce on said portion, said vacuum tank having an inlet and an outlet, means for closing said inlet and for closing said outlet at will, water vapor suction means connected to said vacuum tank for simultaneously creating a vacuum and refrigeration in said tank and in said crates of lettuce, means to introduce into said tank an atomized medium capable of inhibiting the deterioration of said lettuce, and means to control the refrigeration and vacuum in the tank and the operation of said introducing means in predetermined timed relation.

10. In a method of preparing vegetable produce for storing and shipping, the steps of packaging said vegetable produce, the conveying of the packaged vegetable produce on a substantially continuous path toward storing and shipping, the temporarily rendering of a portion of said path airtight around said packages so as to isolate packaged produce and the packages from the atmosphere, the rapidly drawing of a vacuum around said packages and in said vegetable produce in the presence of moisture so as to refrigerate said produce to a predetermined coolness, and the continuing of conveying of the cooled produce away from said portion of the path.

11. In an apparatus for treating vegetable produce, means to draw a vacuum around said vegetable produce so as to rapidly evaporate moisture from said vegetable produce thereby to cool the same, means to automatically stop the drawing of said vacuum after the vegetable produce is cooled to a predetermined low temperature, means actuated by said stopping means to introduce an atomized protective mixture to said vegetable produce in the remaining vacuum before said produce is again exposed to the atmosphere.

12. In a method of cooling and treating fruit and vegetables enclosed in packages exposed to air and moisture, subjecting the packages to a vacuum whereby moisture is rapidly flashed from the surface of the articles for cooling, and introducing a protective atomized solution to the surfaces of the articles for treating and lowering the temperature of the packaged articles in a vacuum.

13. An apparatus for treating vegetable produce comprising, a cooling chamber having an inlet and outlet for said produce, means to close said inlet and outlet at will against the atmosphere, said chamber having a port thereon, means connected to said port to rapidly draw the air out of said chamber through said port, port closing means, and a mechanism controlled by the temperature in the chamber to close said port closing means at a predetermined temperature in said chamber.

14. An apparatus for treating vegetable produce comprising, a cooling chamber having an inlet and outlet for said produce, means to close said inlet and outlet at will against the atmosphere, said chamber having a port thereon, water vapor suction means, means connected to said port to rapidly draw the air out of said chamber through said port, port closing means, and a mechanism controlled by the temperature in the chamber to close said port closing means at a predetermined temperature in said chamber.

15. An apparatus for treating vegetable produce comprising, a cooling chamber having an inlet and outlet for said produce, means to close said inlet and outlet at will against the atmosphere, said chamber having a port thereon, means connected to said port to rapidly draw the air out of said chamber through said port, port closing means, normally closed means to introduce a vaporized medium into said chamber, and a mechanism to close said port closing means after a predetermined action of said vacuum on said produce in the chamber and to open said normally closed vapor introducing means while said port is closed.

16. An apparatus for treating vegetable produce comprising, a cooling chamber having an inlet and outlet for said produce, means to close said inlet and outlet at will against the atmosphere, said chamber having a port thereon, means connected to said port to rapidly draw the air out of said chamber through said port, means to introduce a vapor into said chamber, electrically actuated mechanisms to control respectively said port closing means and said vapor introducing means, and a timed circuit control for said electrically actuated mechanisms to actuate said port closing means for closing the port for predetermined periods and to actuate said vapor introducing means to introduce vapor into said chamber for a predetermined period when said port is closed.

MORRIS KASSER.